US009269216B2

(12) United States Patent
Keilwert

(10) Patent No.: US 9,269,216 B2
(45) Date of Patent: Feb. 23, 2016

(54) GAMING MACHINE HAVING CAMERA FOR ADAPTING DISPLAYED IMAGES TO DETECTED PLAYERS

(71) Applicant: Spielo International Canada ULC, Moncton (CA)

(72) Inventor: Stefan Keilwert, Lannach (AT)

(73) Assignee: IGT Canada Solutions ULC, Moncton, NB (CA)

( * ) Notice: Subject to any disclaimer, the term of this patent is extended or adjusted under 35 U.S.C. 154(b) by 300 days.

(21) Appl. No.: 13/870,658

(22) Filed: Apr. 25, 2013

(65) Prior Publication Data

US 2014/0323192 A1 Oct. 30, 2014

(51) Int. Cl.

*G07F 17/00* (2006.01)
*G06F 19/00* (2011.01)
*G07F 17/32* (2006.01)

(52) U.S. Cl.

CPC ........ *G07F 17/3206* (2013.01); *G07F 17/3227* (2013.01)

(58) Field of Classification Search

CPC . G07F 17/32; G07F 17/3202; G07F 17/3206; G07F 17/3227; G07F 17/3241; G07F 17/34
USPC ........................ 463/16–20, 25, 29–31, 35, 36
See application file for complete search history.

(56) References Cited

U.S. PATENT DOCUMENTS 6,142,876 A * 11/2000 Cumbers ........................ 463/25
7,040,987 B2 * 5/2006 Walker et al. .................. 463/42
7,841,517 B2 * 11/2010 Bortnik et al. ............... 235/380
7,883,413 B2 * 2/2011 Paulsen .......................... 463/29
7,901,285 B2 * 3/2011 Tran et al. ...................... 463/25
8,187,073 B2 * 5/2012 Beaulieu et al. ............... 463/16
8,308,562 B2 * 11/2012 Patton ............................ 463/36
2006/0148560 A1 * 7/2006 Arezina et al. ................. 463/29
2006/0177109 A1 * 8/2006 Storch ........................... 382/118
2007/0087834 A1 * 4/2007 Moser et al. ................... 463/42
2008/0020845 A1 * 1/2008 Low et al. ...................... 463/42

(Continued)

OTHER PUBLICATIONS

Dr.-Ing. Jens-Uwe Garbas, "Shore (TM)—Detection of Objects and Faces" Fraunhofer-Gesellschaft: Fraunhofer Institute for Integrated Circuits IIS, Apr. 8, 2013, <http://www.iis.fraunhofer.de/de/bf/bsy/produkte/shore.html>.

(Continued)

*Primary Examiner* — Milap Shah
(74) *Attorney, Agent, or Firm* — Patent Law Group LLP; Brian D. Ogonowsky

(57) ABSTRACT

In one embodiment, a gaming machine has a digital camera and automatically takes a picture of a player. Facial detection software identifies certain facial characteristics of the player, such as approximate age and gender. Rules software then selects appropriate sets of animation images and sound files that are associated with the detected physical features of the player. The displayed game, user interface, theme, etc. are then adapted to the player's detected features. If the player is identified, by comparing the picture to previously stored pictures, a personalized message may be displayed. When the gaming machine is in an attract mode, the camera may take pictures/videos of passersby and adapt the attract mode animation to the passerby's physical image or movement. In another embodiment, the camera is used to sense physical motions by the player to control aspects of the game or other displayed features.

20 Claims, 6 Drawing Sheets

(56) References Cited

U.S. PATENT DOCUMENTS

| | | | | |
|---|---|---|---|---|
| 2008/0032787 | A1 * | 2/2008 | Low | G07F 17/32 463/29 |
| 2009/0215533 | A1 * | 8/2009 | Zalewski et al. | 463/32 |
| 2010/0016075 | A1 * | 1/2010 | Thomas | 463/30 |
| 2011/0069085 | A1 | 3/2011 | Weber et al. | |
| 2011/0183732 | A1 * | 7/2011 | Block et al. | 463/1 |
| 2012/0214584 | A1 * | 8/2012 | Paquet | 463/30 |
| 2012/0322542 | A1 * | 12/2012 | Chudd et al. | 463/25 |
| 2013/0005443 | A1 | 1/2013 | Kosta et al. | |
| 2013/0012309 | A1 * | 1/2013 | Morrow | 463/29 |
| 2013/0137516 | A1 * | 5/2013 | Griswold et al. | 463/36 |
| 2013/0274007 | A1 * | 10/2013 | Hilbert et al. | 463/29 |
| 2014/0087862 | A1 * | 3/2014 | Burke et al. | 463/29 |
| 2014/0323193 | A1 * | 10/2014 | Keilwert | 463/16 |
| 2014/0323194 | A1 * | 10/2014 | Keilwert | 463/16 |

OTHER PUBLICATIONS

PCT/CA2013/050384, "International Search Report and Written Opinion", 8 pages.

* cited by examiner

GAMING MACHINE HAVING CAMERA FOR ADAPTING DISPLAYED IMAGES TO DETECTED PLAYERS

FIELD OF THE INVENTION

This invention relates to gaming machines and, in particular, to a gaming machine having a camera and software that causes a displayed image (e.g., animation) to be adapted to a detected player or observer.

BACKGROUND

Gaming machines, such as slot machines, are frequently video gaming machines where animated virtual reels are displayed on a flat panel screen. The screen may also display animated bonus games and any information needed to play the games. The screen may be a touch screen where the player can make selections by touching icons (e.g., virtual buttons) displayed on the screen.

Conventional video gaming machines of the same theme (i.e., same proprietary game), made by the same manufacturer, display the same animation to all players. When there is no active player, the gaming machines of the same theme display the same attract mode. In other words, the display animation does not automatically adapt to the particular player or to a particular spectator, such as a passerby.

It is known to add a camera in a gaming machine for identifying a player for security reasons, where certain digitized optical features of a player are compared to a stored image of the player to ensure the player is using her own player tracking card. Cameras, microphones, and speakers have also been installed in gaming machines for enabling one player to communicate, verbally and visually, with another player in the casino. Such cameras and their software do not affect the game animation or attract mode animation.

What is needed is a way to draw more attention to a particular gaming machine, to promote additional play of that gaming machine, by automatically customizing the gaming machine's display animation for a particular player or spectator.

What is also needed is a way to make a particular gaming machine more fun to play by detecting movements of the player and adapting such movements in the displayed animation.

SUMMARY

A gaming machine console (included in the term "gaming machine") incorporates a conventional video and/or still-frame camera at the front of the console. The camera periodically takes a picture or takes a video of the player or other people in its field of view, and software processes the frames. The frames are then analyzed and are used to adapt the gaming machine's displayed animation to the player or people detected.

In one embodiment, the player's face is analyzed by face recognition software to determine the player's age. The displayed game animation and the game itself may then automatically be adapted to the player's detected age.

In another embodiment, the face recognition software also detects the gender of the player, and the displayed game animation and the game itself may then automatically be adapted to the player's detected gender.

The player's detected face (i.e., a set of standard digital markers) may also be compared to stored images (stored digital markers) of registered players. If there is a match, the player's identification and stored gaming history are then known to the system. The gaming machine may then display a personalized message such as, "Welcome Back" and offer the player the option to present content based on the player's previous playing preferences (e.g., specific games in a multigame). The message may also identify the player by name.

The camera and software may also detect non-players that are spectators or just passing by the gaming machine. In such a case, it is desirable for the gaming machine to attract that potential player by adapting its display to the particular detected person. For example, a stored character "looks" in the direction of a moving spectator and may address the spectator, such as by referring to the spectator's actual appearance (e.g., refer to a detected logo on the spectator's clothes, etc.). A particular amusing character may selected that generally looks like the detected player, and the software may combine stored features to generally recreate the detected player.

Motion detection software may also be applied to video frames taken by the camera to adapt the player's motions to animations displayed on the gaming machine.

Many other examples are given herein. The invention may also be applied to home computers, laptops, smartphones, and other computing devices with cameras that are temporarily used a gaming machines for carrying out a game of chance.

BRIEF DESCRIPTION OF THE DRAWINGS

Elements that are the same or equivalent are labeled with the same numeral.

DETAILED DESCRIPTION

Although the invention can typically be implemented by installing a software program and camera in most types of modern video gaming machines, one particular gaming machine platform will be described in detail.

Figure 1:
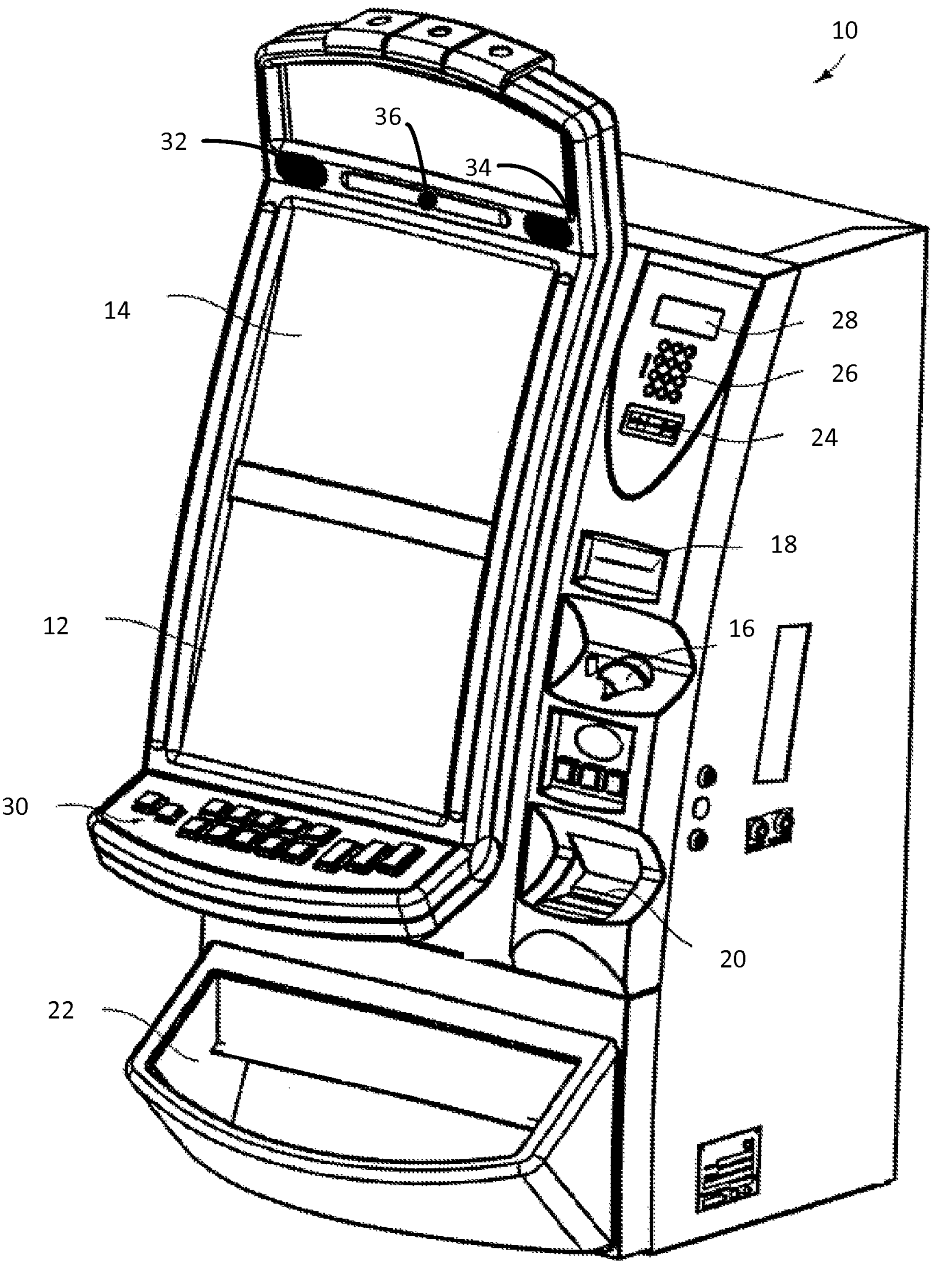
FIG. 1 is a perspective view of a particular gaming machine console containing a camera, speakers, a microphone, and suitable software to carry out the present inventions.

FIG. 1 is a perspective view of a gaming machine 10, which is a gaming machine console, that incorporates the present invention. Machine 10 includes a display 12 that may be a thin film transistor (TFT) display, a liquid crystal display (LCD), a cathode ray tube (CRT), or any other type of display. In one embodiment, the display 12 displays the main game, which may be an animated video reels-type game that emulates the spinning and random stopping of physical reels. The display 12 may also display an attention-getting attract mode animation when the machine 10 is not being used by a player.

A second display 14 provides game data or other information in addition to display 12. Display 14 may provide information such as an advertisement for the game, an attract mode animation, the rules of the game, pay tables for each bet amount and winning symbol combination, or other information, or may even display the main game or the bonus games along with display 12. Possible other uses of the displays in accordance with the invention are discussed below. Alternatively, the area for display 14 may be a display glass for conveying relevant information.

Display 12 or 14 may have a touch screen lamination that includes a transparent grid of conductors. Touching the screen changes the capacitance between the conductors, and thereby the X-Y location of the touch may be determined. The processor associates this X-Y location with a function to be performed. Such touch screens are very well known in the field of slot machines.

A coin slot 16 accepts coins or tokens in one or more denominations to generate credits within machine 10 for playing games. An input slot 18 for an optical reader and printer receives machine readable printed tickets and outputs printed tickets for use in cashless gaming. A bill acceptor 20 accepts various denominations of banknotes.

A coin tray 22 receives coins or tokens from a hopper upon a win or upon the player cashing out.

A card reader slot 24 accepts any of various types of cards, such as smart cards, magnetic strip cards, player tracking cards, or other types of cards conveying machine readable information. The card reader reads the inserted card for player and credit information for cashless gaming. The card reader may also include an optical reader and printer for reading and printing coded barcodes and other information on a paper ticket.

A keypad 26 accepts player input, such as a personal identification number (PIN) or any other player information. A display 28 above keypad 26 displays a menu for instructions and other information and provides visual feedback of the keys pressed.

Player control buttons 30 include any buttons needed for the play of the particular game or games offered by machine 10 including, for example, one or more bet buttons, a repeat bet button, a spin reels button, a maximum bet button, a cash-out button, a display payout tables button, select icon buttons, free game play buttons, and any other suitable button. Buttons 30 may be replaced by a touch screen with virtual buttons. In one embodiment, to simplify betting, there are only a limited number of betting options, such as five, and each betting option has a separate button 30.

Speakers 32 generate stereo sound. A microphone 34 may allow the player to interact with the gaming machine software.

A camera 36 periodically takes digital pictures and video frames, as described in detail below.

Figure 2:
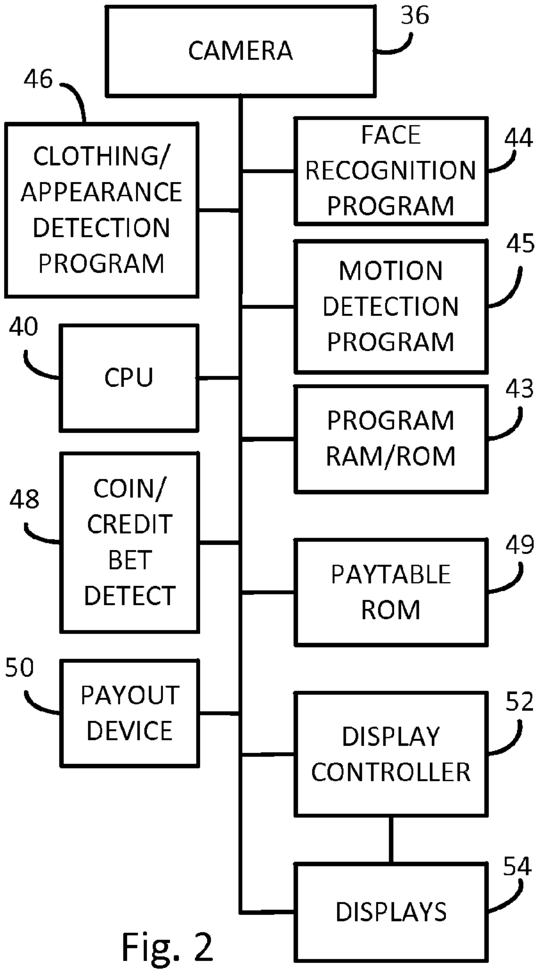
FIG. 2 illustrates various functional units in the gaming machine for carrying out the inventions.

FIG. 2 illustrates basic circuit blocks in a suitable gaming device. A control unit (CPU 40) runs gaming programs stored in a program RAM/ROM 43. The programs also include software files used to carry out the present inventions, including a face recognition program 44, a motion detection program 45, and a clothing/appearance detection program 46. Multiple alternative animations (images) are also stored in the RAM/ROM 43 and are selected for display based on the visual detection of a player or spectators, as described below. The rules software for determining which stored animation should be displayed based on the analysis performed by the programs 44-46 is also contained in the RAM/ROM 43. The RAM/ROM 43 also contain any audio files and audio rules software for selecting audio files based on the visual detection of the player or spectator. All memory accessed by the gaming machine, even if distributed, is grouped herein in the single term "memory" since the specific hardware used for the memory is not relevant to the invention.

A coin/credit bet detector 48 enables the CPU 40 to initiate a next game and generate credits. A paytable ROM 49 detects the outcome of the game and identifies awards to be paid to the player. A payout device 50 pays out an award to the player in the form of coins, a coded paper ticket, credits on a smart card or magnetic strip card, or any other form upon termination of the game or upon the player cashing out. A display controller 52 receives commands from the CPU 40 and generates signals for the various displays 54. If a display 54 is a touch screen, player commands may be input through the display screen into the CPU 40. All components may be connected to a single bus.

Operation of Gaming Machine Incorporating Invention

In one embodiment, the player's face is analyzed using the digital camera 36 and the face recognition program 44 to determine the player's age.

Figure 3A:
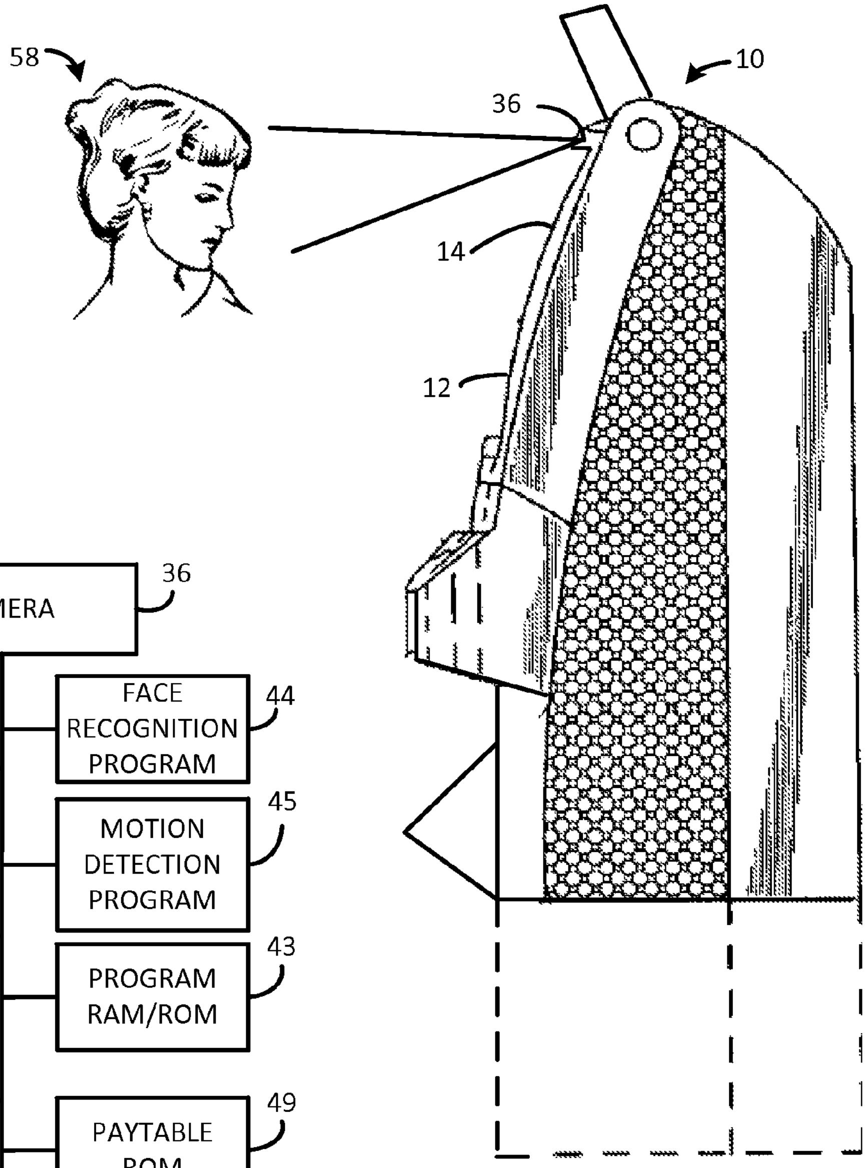
FIG. 3A is a side view of a gaming machine console, such as in FIG. 1, illustrating the camera's detection of the player's face.
Figure 3B:
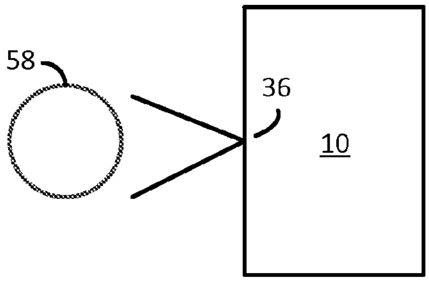
FIG. 3B is a top down schematic view of the camera detecting the player's face.

FIG. 3A and the top down view of FIG. 3B illustrate the typical position of a player's 58 face relative to the camera 36. Although the camera 36 may have a wide field of view, in the face recognition phase only the central portion of the picture frame is analyzed since it contains the player's facial features.

Figure 4:
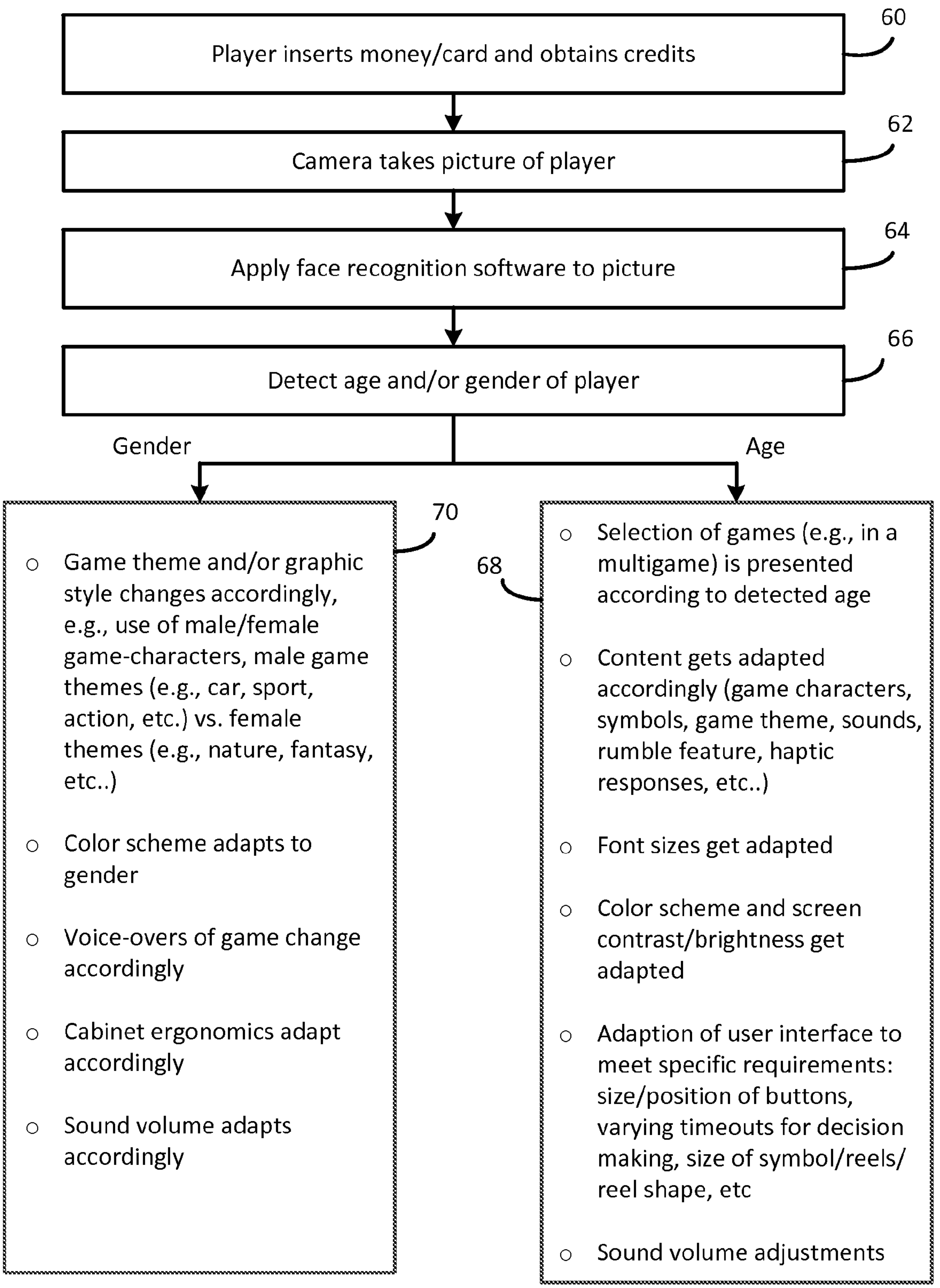
FIG. 4 is a flowchart identifying various examples of adaptions of the display animation to the player's detected gender or age.

The operation of the gaming machine 10 when using face recognition of the player 58 is described with respect to the flowchart of FIG. 4.

In step 60, the software detects that a new player 58 has just deposited money for credits or has inserted her player tracking card into the gaming machine 10, and the camera 36 is controlled to take a picture of the player (step 62).

The picture is analyzed using any suitable face recognition software (step 64), such as the SHORE™ (Sophisticated High-Speed Object Recognition Engine) program commercially available from Fraunhofer Institute for Integrated Circuits. This particular program detects the positions of the person's face and eyes, determines the gender and age, determines the expression (e.g., happy, surprised, confused, etc.), and other information.

In the example of FIG. 4, the player's gender and approximate age are detected (step 66). The detected age may be categorized into one of the following groups, for example: below 40, 40-60, and above 60, since the specific age is not important. The different groups of players are generally assumed to have different preferences for style, music, and culture and have different physical attributes.

The gaming program contains a variety of rules that are automatically triggered by the player's detected gender and age group. These different rules cause the displayed animation on the displays 12 and 14 to change as described below.

Regarding age-related rules, the displayed game animation, sounds, and the game itself may automatically be adapted to what are typical characteristics of a player in one of the age groups. The changes in the animation, sound, or game may relate to the music (or sound effects) presented, the game theme (e.g., themes relating to events/styles from the 1950s, 1960s, 1980s, 2000s, etc.), the increasingly poor eyesight as a player ages, the complexity of the game, etc. For example, as shown in step 68, the following features may be adapted to the detected age group: the selection of games (e.g., in a multigame gaming machine); the game content (game characters, symbols, game theme, sounds, rumble feature, haptic responses, etc . . . ); alpha-numeric font sizes (enlarged with detected ages over 40); color scheme and screen contrast/brightness; the user interface and game symbols (size/position of buttons, varying timeouts for decision making, size of symbol/reels/reel shape, etc.); and sound volume adjustments may be made.

Regarding gender-related rules, the displayed game animation and the game itself may automatically be adapted to what are typical preferences of a male or female player in the detected age group. For example, as shown in step 70, the game theme and/or graphic style changes accordingly such as the use of male/female game-characters and male game themes (e.g., car, sport, action) vs. female themes (e.g., nature, fantasy); the color scheme adapts to gender; voice-overs of game change accordingly such as from male to female; cabinet ergonomics adapt accordingly; and sound volume adapts accordingly (assuming males want louder sounds).

The various adaptions that are most preferred for certain ages and genders may be determined by empirical testing.

The game designer may have any number of stored alternative animations (displayed images) in the RAM/ROM 43 for each combination of age and gender. The animation may be part of the main game, the bonus game, and/or the user interface. In the context of this disclosure, the term "animation" refers to any displayed image (including letters, numbers, characters, etc.) on the display screen.

The animation may also be adapted to the player's detected facial expression. For example, a message or animation may be selected in an attempt to cause the player to smile, and the animation adapts to whether the software recognizes that the player is smiling.

Figure 5:
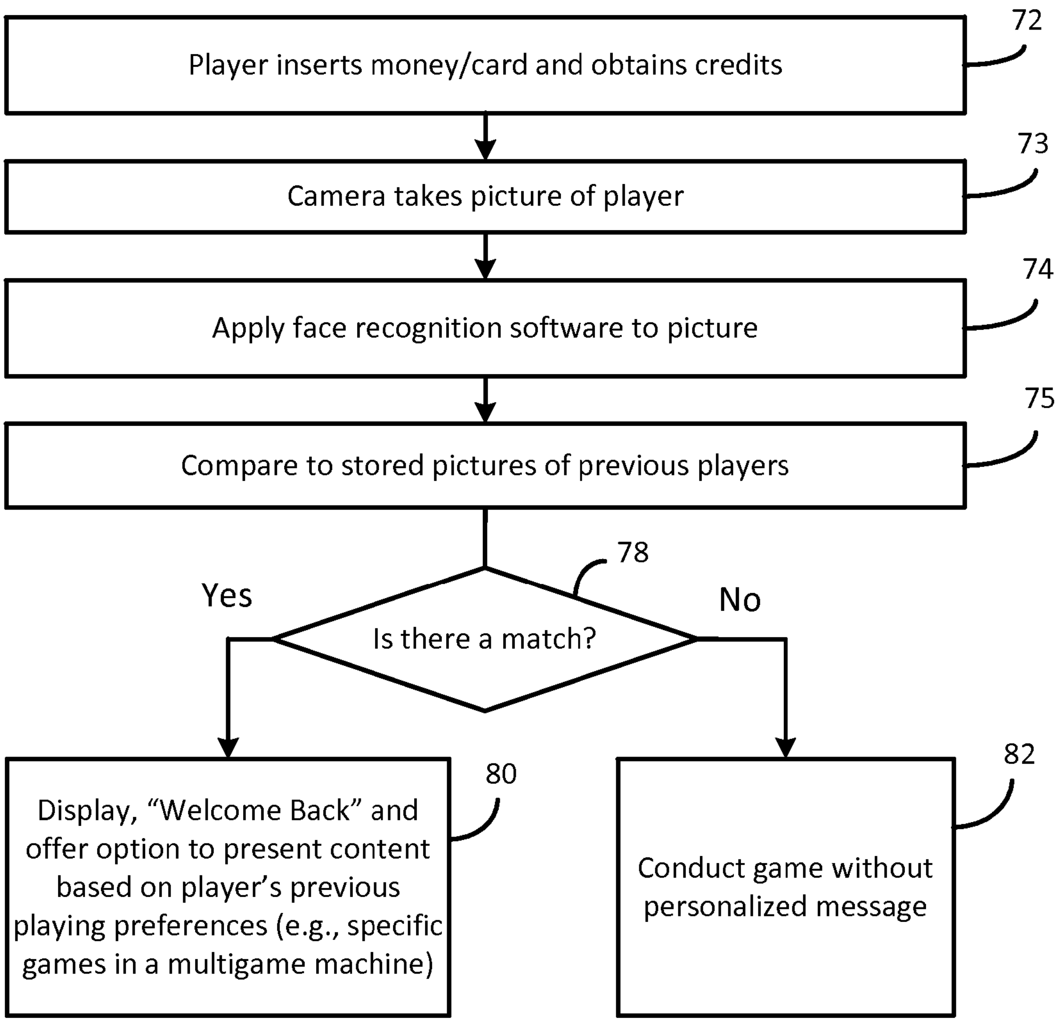
FIG. 5 is a flowchart identifying an example of an adaption of the display animation when the player's identity is detected.

As shown in the flowchart of FIG. 5, the player's face (i.e., a set of standard digital markers generated by the face recognition software) may also be compared to stored images (stored digital markers) of registered players (steps 72-75). The stored images may have been obtained when the player played other gaming machines with the camera feature, or the stored images may be from when the player initially registered for a player tracking card. If there is a match (step 78), the player's stored gaming history is then known to the system. The gaming machine may then display a personalized message (step 80) such as, "Welcome Back", and offer the player the option to present content based on the player's previous playing preferences (e.g., specific games in a multigame machine). If there is no match, the game may be carried out without such a personalized message (step 82).

Figure 6:
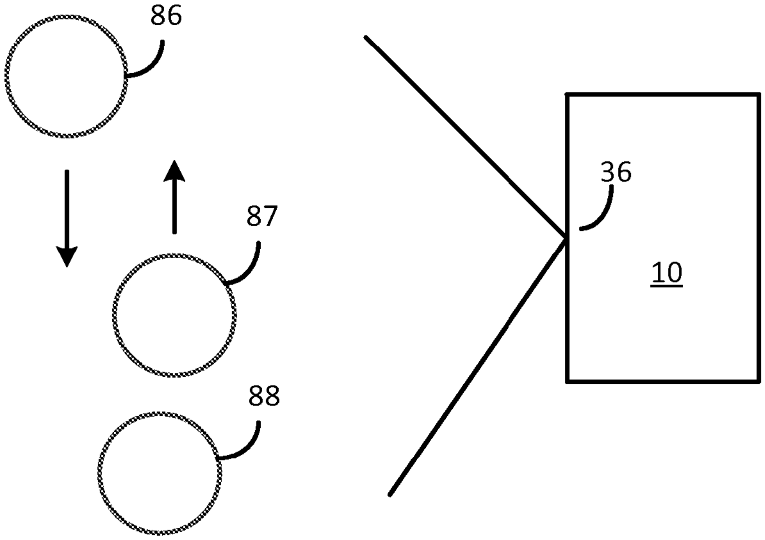
FIG. 6 is a schematic top down view of the camera detecting spectators or passersby.
Figure 7:
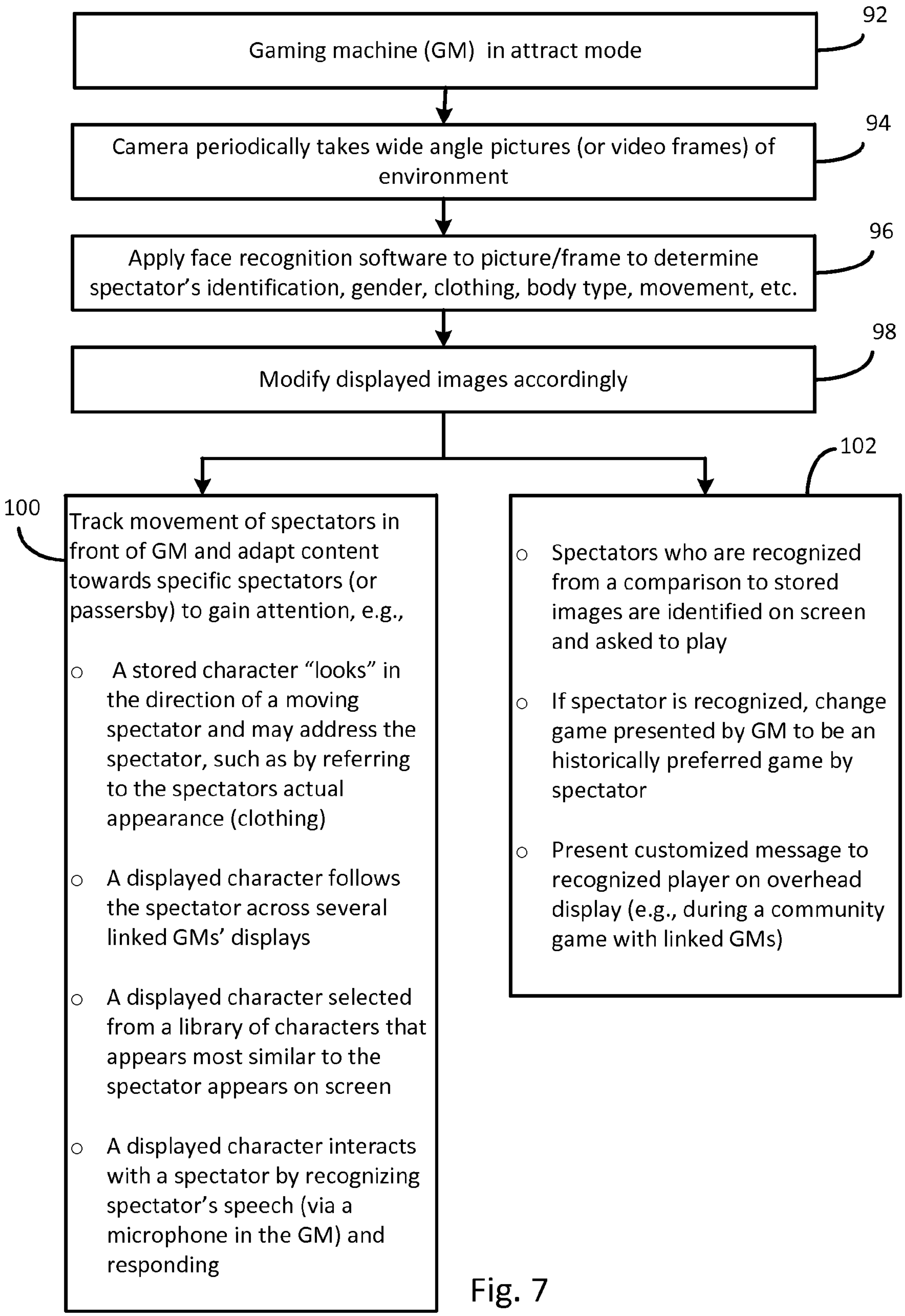
FIG. 7 is a flowchart identifying examples of adaptions of the display animation to spectators or to the specific appearance or identities of spectators.

The camera and software may also detect non-players that are spectators or just passing by the gaming machine. FIG. 6 is a top down view showing various spectators or passersby 86-88 and the wide field viewing angle of the camera 36. In such a case, it is desirous for the gaming machine 10 to attract those potential players by adapting its display to one or more of the detected people. FIG. 7 illustrates certain steps performed by the gaming machine in its attract mode (step 92). The camera 36 periodically (e.g., every 0.1 second) takes a picture frame encompassing a wide angle to detect nearby people (step 94). The face recognition software analyzes the peoples' faces, clothing, body types, and movement. The rules are then applied to a selected one of the spectators to determine the spectator's identification, gender, clothing, body type, movement, etc. (step 96). The detected features are then categorized and applied to the attract mode animation rules to modify the attract mode images accordingly (step 98). In other words, the recognition software is used to select one or a combination of stored animations to display. For example, as shown in step 100, a selected stored character (which most looks or dresses like the spectator) "looks" in the direction of a moving spectator and may address the spectator, such as by referring to the spectator's actual appearance (clothing); a displayed character follows the spectator in a coordinated fashion across several linked gaming machines' displays; a displayed character selected from a library of characters that appears most similar to the spectator appears on screen; and a displayed character interacts with a spectator by recognizing the spectator's speech (via a microphone 34 in the GM) and responding via the speakers 32.

Spectators who are recognized from a comparison to stored images (step 102) may be identified on screen and asked to play by an animated character or a message. If the spectator is recognized, the game offered by the GM may be changed to be a historically preferred game by the spectator. The GM may present a customized message to a recognized spectator on an overhead display (e.g., during a community game with linked GMs).

Figure 8:
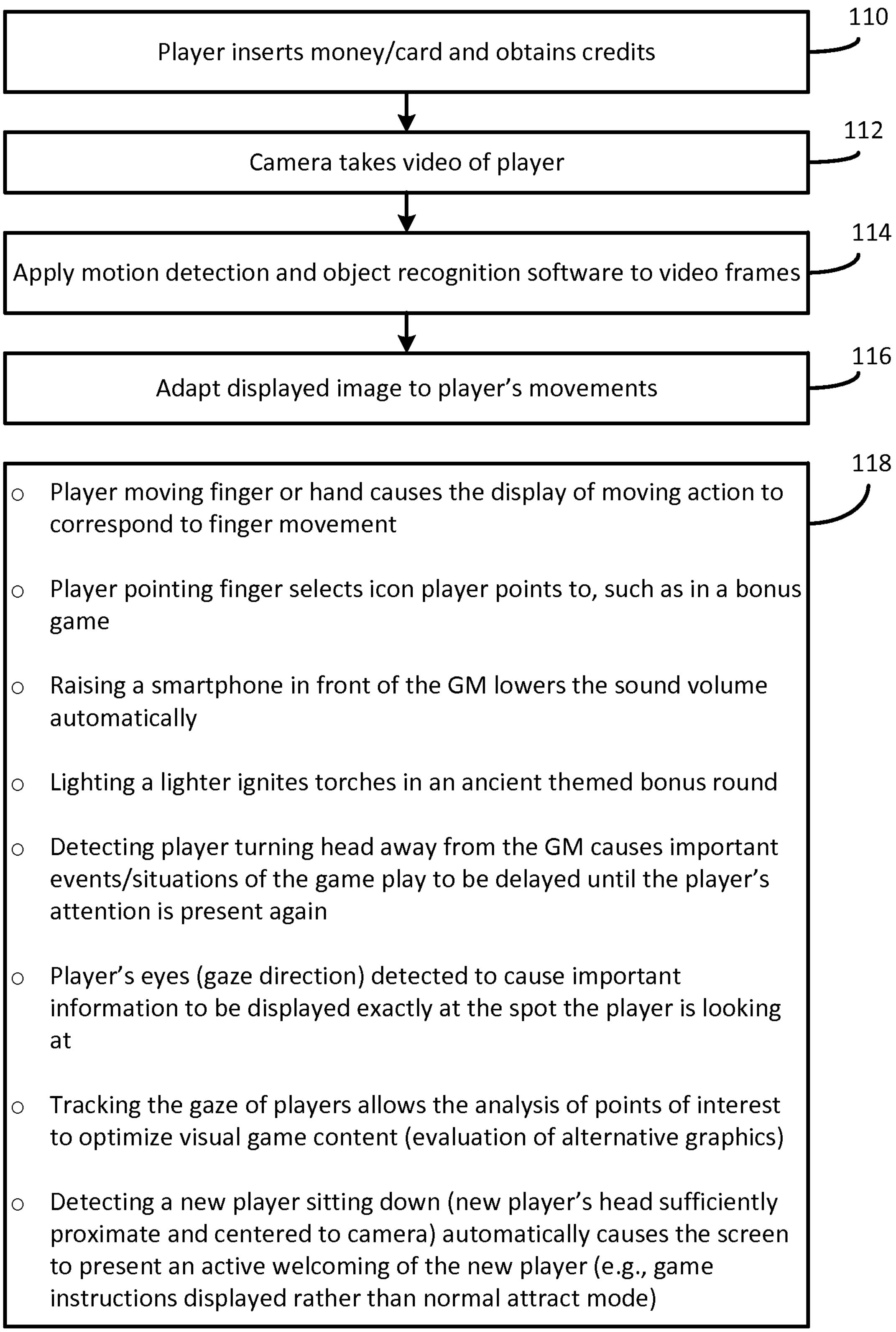
FIG. 8 is a flowchart identifying examples of adaptions of the display animation to movements of the player.

As shown in FIG. 8, motion detection software may also be applied to video frames taken by the camera 36 while the player 58 is actively playing a game. The player's motions are applied rules to adapt the animations displayed on the gaming machine to the player's motions. In FIG. 8, the player initiates the game by inserting money or a card and obtaining credits (step 110). At any point in a game, such as during a bonus game that involves player input, the camera takes a video of the player (step 112) and the software detects the motions of a recognized object (step 114), such as the player moving her finger or hand to wave a magic wand in the bonus game. The motion detection software then triggers various animation rules that causes the animated object to move in accordance with the player's movement, or causes an animated character to move (step 116). Various examples are given in step 118, including: player moving a finger or hand causes the display of moving action to correspond to finger movement; player pointing finger selects icon player points to, such as in a bonus game; raising a smartphone in front of the GM lowers the sound volume automatically; lighting a cigarette lighter ignites torches in an ancient themed bonus round; detecting a player turning her head away from the GM causes important events/situations of the game play to be delayed until the player's attention is present again; player's eyes (gaze direction) are detected to cause important information to be displayed exactly at the spot the player is looking at; tracking the gaze of players allows the analysis of points of interest to optimize visual game content (evaluation of alternative graphics); and detecting a new player sitting down (new player's head sufficiently proximate and centered to camera) automatically causes the screen to present an active welcoming of the new player (e.g., game instructions displayed rather than normal attract mode).

The various animations may be displayed on either of the displays 12 or 14 in FIG. 1. In one embodiment, the adaption only affects the images on the top display 14 so as not to affect the game displayed on the bottom display 12.

The inventions are not limited by the various examples given herein. Other examples of using a visual capture by the camera include:

The camera system detects the brightness of its environmental light and adjusts screen settings accordingly to increase player convenience and save energy If a group of spectators observes a community game playoff, they get recognized as such, they get specific content (messages, games, etc.) on the overhead display to "onboard" them to the community game Use of an array of several cameras that are viewing different areas of a room to track players across a venue to detect their skeletons even if their bodies are partly hidden by objects (desk, cupboard, etc.)

Even cameras in players' devices could be used and integrated (smartphone, tablets)

The camera recognizes brands of player's clothing and adapts animation to show characters with similar clothing (e.g., by modification of game content)

If a player's glass gets empty, the GM recognizes this early enough to automatically call for the waiter to come to the player The camera acts as a mirror, so the player and spectators can see the player's face on the gaming machine's display screen or on an overhead display The camera reads various codes (QR, barcode, logos, etc.) and processes the data and/or modifies the displayed content The camera records special moments of the players sessions (audio, video, stills) and provides a functionality to share these moments via social media channels to send the data to other devices (smartphone, tablet, etc.)

Offer a "replay" functionality of important game situations

Use a 360 degree rotatable chair in combination with a camera to record a 3D-model of a player's head or body Use two cameras on both edges of a gaming machine to create a stereoscopic 3D-picture/video of a player The term gaming machine, as used herein, includes any computer device that is a dedicated gaming machine, typically housed in a special cabinet for security, or any computing device that has multiple uses but is temporarily configured (by programming) as a gaming device, such as a home computer, a laptop computer, or a smartphone. The term gaming machine console, as used herein, refers to a gaming machine console of the type used in a licensed establishment (e.g., a casino). The gaming machine displays at least a game of chance involving a pseudo-random element, such as a video reels game, a card game, a wheel spinning game, or any other game of chance.

A gaming machine, in the context of the present invention, is distinguished from an interactive amusement game (not considered "gaming") where the player's movements directly control an image (an avatar), such as for playing a simulated sports game. It is known to use a camera for directly controlling an avatar in an amusement game to emulate movement of the player; however, such controlling of an avatar does not relate to the very different uses of the present invention in the field of gaming, such as configuring a game of chance for the detected age or gender of the player, or attracting passersby to a gaming machine, etc.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming machine that uses characteristics of a player's detected image to select a game theme, the machine comprising:

at least one display device for displaying a game of chance;

a digital camera, within a housing of the gaming machine, configured to take a picture of a player of the gaming machine, the picture directly conveying physical characteristics of the player;

an accepting device configured to accept a physical item associated with a monetary value, the monetary value establishing a credit balance, the credit balance being increasable and decreasable based at least on wagering activity;

a cashout device configured to receive an input to cause an initiation of a payout associated with the credit balance;

a processor configured to control the at least one display device to display the game of chance, having a pseudo-random element, and any award to the player based on an outcome of the game, when the gaming machine is being actively played;

the processor also configured to receive a wager placed for play of the game of chance, the wager amount decreasing the credit balance;

a memory device configured to store detection software for detecting the physical characteristics of the player from the picture, wherein the detection software analyzes the picture of the player and identifies, directly from the picture, without accessing any predetermined player data relating to the player's age and gender, at least one of the player's age group and gender at a beginning of a playing session of the game of chance;

the memory device also configured to store a plurality of sets of alternative animation images for selection and display on the at least one display device, the animation images including a variety of game themes having different overall visual presentations;

the memory device also configured to store rules software, executable by the processor, for associating the age group or gender of the player, detected from the picture, with a particular set of stored animation images for one of the game themes and selecting the particular set of stored animation images game theme for display; and the memory device also configured to store display software, executable by the processor, for displaying, on the at least one display device, the set of stored animation images of the game of chance having the game theme selected by the rules software based on the age group or gender of the player detected from the picture;

the memory device also configured to store a plurality of sets of alternative audio files for reproduction by a speaker mounted on the housing, wherein different ones of the audio files being associated with the different game themes;

the memory device also configured to store sound generation software, executable by the processor, for controlling the speaker to reproduce one or more certain sets of the plurality of sets of alternative audio files associated with the game theme selected by the rules software based on the age group or gender of the player detected from the picture; and the processor also configured to detect the input to cause the initiation of the payout, via the cashout device.

2. The machine of claim 1 wherein the detected physical characteristics of the player comprise the player's approximate age.

3. The machine of claim 2 wherein the detected physical characteristics of the player comprise the age group of the player.

4. The machine of claim 1 wherein the detected physical characteristics of the player comprise the player's gender.

5. The machine of claim 1 wherein the detection software comprises age detection software.

6. The machine of claim 1 wherein the detection software comprises gender detection software.

7. The machine of claim 1 wherein the set of stored animation images selected by the rules software based on the detected physical characteristics of the player comprises images of alpha-numeric characters.

8. The machine of claim 1 wherein the set of stored animation images selected by the rules software based on the detected physical characteristics of the player determines a game played on the gaming machine.

9. The machine of claim 1 further comprising:

the memory device also configured to store audio rules software, executable by the processor, for associating detected physical characteristics of the player with one or more certain sets of the audio files, wherein the audio files comprises different types of music; and wherein the sound generation software stored in the memory device for controlling the speaker is configured to reproduce the one or more certain sets of audio files of a particular type of music selected by the audio rules software based on the detected physical characteristics of the player.

10. The machine of claim 1 wherein the detection software for detecting physical characteristics of the player from the picture comprises face detection software for comparing a picture of the player's face to stored images and determining an identity of the player if a match is found.

11. The machine of claim 10 wherein the rules software selects a personalized message for the identified player; and wherein the display software controls the display screen to display the personalized message on the display device.

12. A method performed by a gaming machine having a digital camera comprising:

accepting a physical item associated with a monetary value by an accepting device of the gaming machine, the monetary value establishing a credit balance, the credit balance being increasable and decreasable based at least on wagering activity;

receiving a wager placed for play of a game of chance, the wager amount decreasing the credit balance;

taking a digital picture of a player at a gaming machine by a digital camera within a housing of the gaming machine, the picture directly conveying physical characteristics of the player;

detecting physical characteristics of the player from the picture using detection software stored in a memory device of the gaming machine and executable by a processor of the gaming machine, wherein the detection software analyzes the picture of the player and identifies, directly from the picture, without accessing any predetermined player data relating to the player's age and gender, at least one of the player's age group and gender at a beginning of a playing session of the game of chance;

displaying, on at least one display device of the gaming machine, the game of chance having a pseudo-random element;

applying first rules software, stored in the memory device and executable by the processor, associating the age group or gender of the player detected from the picture with a particular set of animation images, among a plurality of sets of alternative animation images stored in the memory device, the animation images including a variety of game themes having different overall visual presentations, and selecting the particular set of stored animation images of a game theme for display on the at least one display device; and displaying, on the at least one display device of the gaming machine, the particular set of stored animation images of the game of chance having the game theme selected by the first rules software based on the age group or gender of the player detected from the picture;

applying second rules software, stored in the memory device and executable by the processor, associating the age group or gender of the player detected from the picture with one or more sets of audio files within a plurality of sets of alternative audio files stored in the memory device for a reproduction by a speaker mounted on the housing, different ones of the sets of alternative audio files being associated with the different game themes;

controlling the speaker to reproduce the sets of audio files associated with the game theme selected by the second rules software based on the age group or gender of the player detected from the picture; and receiving an input to cause an initiation of a payout via a cashout device of the gaming machine.

13. The method of claim 12 wherein the detected physical characteristics of the player comprise the age group of the player.

14. The method of claim 12 wherein the detected physical characteristics of the player comprise the player's gender.

15. The method of claim 12 wherein the particular set of stored animation images comprises images of characters.

16. The method of claim 12 wherein the particular set of stored animation images comprises images of alpha-numeric characters.

17. The method of claim 12 wherein the particular set of stored animation images determines the game of chance played on the gaming machine.

18. The method of claim 12 further comprising comparing attributes of the digital picture to previously stored pictures and determining the identity of the player if a match is found.

19. The method of claim 18 further comprising selecting a personalized message for the identified player; and controlling the display device to display the personalized message.

20. The method of claim 12 wherein the one or more sets of audio files associated with the game theme selected by the second rules software comprises music associated with the game them.

* * * * *